(12) United States Patent
Wang et al.

(10) Patent No.: US 10,342,025 B2
(45) Date of Patent: Jul. 2, 2019

(54) DYNAMIC DELAY SCHEDULING METHOD AND BASE STATION FOR VOICE DATA

(71) Applicant: DATANG MOBILE COMMUNICATIONS EQUIPMENT CO., LTD., Beijing (CN)

(72) Inventors: Guiying Wang, Beijing (CN); Simeng Cao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 15/740,000

(22) PCT Filed: Jan. 22, 2016

(86) PCT No.: PCT/CN2016/071792
§ 371 (c)(1),
(2) Date: Dec. 27, 2017

(87) PCT Pub. No.: WO2017/000548
PCT Pub. Date: Jan. 5, 2017

(65) Prior Publication Data
US 2018/0192427 A1    Jul. 5, 2018

(30) Foreign Application Priority Data

Jun. 30, 2015  (CN) .......................... 2015 1 0377761

(51) Int. Cl.
*H04W 72/12*       (2009.01)
*H04W 72/04*       (2009.01)
(Continued)

(52) U.S. Cl.
CPC ....... *H04W 72/12* (2013.01); *H04W 28/0268* (2013.01); *H04W 72/042* (2013.01);
(Continued)

(58) Field of Classification Search
CPC .............. H04W 72/12; H04W 72/042; H04W 72/0413; H04W 28/0268; H04W 72/048; H04W 72/04; H04W 88/08
See application file for complete search history.

(56) References Cited

U.S. PATENT DOCUMENTS

2007/0217443 A1* 9/2007 Sakoda ............... H04W 74/002
                                                370/463
2007/0234229 A1* 10/2007 Ohtsuka .................. G06T 15/30
                                                715/781
(Continued)

FOREIGN PATENT DOCUMENTS

CN         102244932 A       11/2011
CN         102647718 A        8/2012
(Continued)

OTHER PUBLICATIONS

HTC Corporation: "BSR Triggering with Semi-Persistent Scheduling" 3GPP Draft; R2-085201_BSR_Triggering_With_SPS_V2, 3rd Generation Partnership Project (3GPP), Mobile Competence Centre; Sep. 22, 2008.*

(Continued)

*Primary Examiner* — Mounir Moutaouakil
(74) *Attorney, Agent, or Firm* — Kilpatrick Townsend & Stockton LLP

(57) ABSTRACT

The present invention relates to a dynamic delay scheduling method and base station for voice data. The dynamic delay scheduling method includes the following steps: judging whether semi-persistent scheduling manner is started, and whether the UE supports semi-persistent scheduling manner; if semi-persistent scheduling manner is started, and the UE supports semi-persistent scheduling manner, implementing scheduling in semi-persistent scheduling manner; else if semi-persistent scheduling manner is not started, or the UE does not support semi-persistent scheduling manner, judging (Continued)

whether dynamic delay scheduling manner is started, if yes, implementing scheduling by binding two consecutive voice data packets in dynamic delay scheduling manner; else if not, implementing scheduling in dynamic scheduling manner. By adopting the dynamic delay scheduling method and base station provided by the present invention, the PDCCH resource overhead is reduced by half, meanwhile, higher level of modulation and encoding is kept, and flexibility of voice service scheduling is improved, which is beneficial to reasonable allocation of channel resources and improving user capacity of the base station.

8 Claims, 4 Drawing Sheets

(51) Int. Cl.
  *H04W 28/02* (2009.01)
  *H04W 88/08* (2009.01)
(52) U.S. Cl.
  CPC ..... *H04W 72/048* (2013.01); *H04W 72/0413* (2013.01); *H04W 88/08* (2013.01)

(56) References Cited

U.S. PATENT DOCUMENTS

| | | | | |
|---|---|---|---|---|
| 2009/0052420 | A1* | 2/2009 | Fischer | G08C 17/02 370/338 |
| 2009/0196236 | A1* | 8/2009 | Cai | H04L 47/10 370/329 |
| 2009/0197610 | A1* | 8/2009 | Chun | H04W 72/1284 455/450 |
| 2009/0238120 | A1* | 9/2009 | Cai | H04W 72/1284 370/329 |
| 2009/0268693 | A1* | 10/2009 | Lindh | H04W 72/042 370/336 |
| 2010/0135166 | A1* | 6/2010 | Ahluwalia | H04L 47/10 370/252 |
| 2010/0238875 | A1* | 9/2010 | Sung | H04L 12/66 370/329 |
| 2011/0188463 | A1 | 8/2011 | Kim | |
| 2011/0287738 | A1* | 11/2011 | Peisa | H04W 24/08 455/405 |
| 2012/0039263 | A1* | 2/2012 | Moberg | H04W 72/1284 370/329 |
| 2012/0069805 | A1* | 3/2012 | Feuersanger | H04W 72/1284 370/329 |
| 2012/0127879 | A1* | 5/2012 | Lin | H04L 47/10 370/252 |
| 2014/0161083 | A1 | 6/2014 | Nobukiyo et al. | |
| 2015/0305061 | A1* | 10/2015 | Feuersaenger | H04W 72/1284 370/329 |
| 2016/0278009 | A1* | 9/2016 | Sorrentino | H04W 72/02 |
| 2018/0249531 | A1* | 8/2018 | Feuersaenger | H04W 52/0225 |

FOREIGN PATENT DOCUMENTS

| | | |
|---|---|---|
| CN | 102651662 A | 8/2012 |
| CN | 104244424 A | 12/2014 |
| CN | 104581970 A | 4/2015 |
| CN | 105142220 A | 12/2015 |
| EP | 2475208 A1 | 7/2012 |
| JP | 2013059004 A | 3/2013 |
| WO | 2012146123 A1 | 11/2012 |

OTHER PUBLICATIONS

HTC Corporation: "36.321 CR for BSR Triggering with Semi-Persistent&mnsp;Scheduling" 3GPP Draft; R2-087205_CR, 3rd Generation Partnership Project (3GPP), Mobile Competence Centre, Nov. 14, 2008.*

Ayman Einashar et al: "Voice Evolution in 4G Networks" In: "Design, Deployment and Performance of 4G-LTE Networks", John Wiley & Sons, Ltd, Chichester, UK, XP055236584, Apr. 15, 2014, 62 pages.

Tokunaka Kazuhito, et al., "Development of VoLTE to Realize New Voice Service", NTT DOCOMO INC, Aug. 7, 2018,19 pages.

* cited by examiner

DYNAMIC DELAY SCHEDULING METHOD AND BASE STATION FOR VOICE DATA

FIELD

This application is a US National Stage of International Application No. PCT/CN2016/071792, filed on Jan. 22, 2016, designating the United States, and claiming the benefit of Chinese Patent Application No. 201510377761.3, filed with the Chinese Patent Office on Jun. 30, 2015 and entitled "Dynamic delay scheduling method and base station for voice data", which is hereby incorporated by reference in its entirety.

The invention relates to a dynamic delay scheduling method and base station for voice data, and belongs to the technical field of communication.

BACKGROUND

Long Term Evolution (LTE) is a kind of all-IP based radio communication technology, and has become the most powerful competitor of 4G standard with high-speed uplink/downlink data transmission rate, flexible bandwidth configuration, and simplified network architecture. LTE radio interface resources are commonly shared, and signaling and data compete for the commonly shared resources simultaneously for transmission. Currently, the radio resource scheduling schemes which may be used for Voice over LTE (VoLTE) include dynamic scheduling, semi-persistent scheduling and group scheduling, and the like. Dynamic scheduling is a universal scheduling method. For each basic unit of radio resource scheduling, Physical Resource Block (PRB), the scheduler may assign a resource according to a resource request of the User Equipment. Semi-persistent scheduling is a scheduling method aiming at real time services including VoLTE which may reduce signaling overhead and increase system capacity.

The output rule of voice data packet is shown in FIG. 1. In a stage with no call, no voice packet needs to be scheduled, so dynamic scheduling of other data services may be conducted, such as File Transfer Protocol (FTP) or User Datagram Protocol (UDP). In a call stage, a sampling packet will be produced in every 20 ms when users are calling. Therefore, generation of the voice message of user is predicable. Under such circumstance, semi-persistent scheduling may be adopted to avoid performing dynamic scheduling each time, thereby improving the voice transmission capacity by about 20%. In a stage of call interval, theoretically, a background sound symbol will be produced in every 160 ms, and there is no voice data scheduling. When a voice service starts, dynamic scheduling mode is adopted for scheduling, and determining whether the semi-persistent scheduling is enabled and whether the User Equipment (UE) supports the semi-persistent scheduling mode, if the semi-persistent scheduling mode is enabled and the UE supports the semi-persistent scheduling mode, then the UE will be configured for scheduling in semi-persistent scheduling mode; otherwise, dynamic scheduling mode will be used for scheduling. According to 3GPP specification, the level range of uplink/downlink Modulation and Coding Scheme (MCS) of dynamic scheduling is 0~28; during each scheduling, Downlink Control Information (DCI) is issued, so resource overhead of Physical Downlink Control Channel (PDCCH) is big. The MCS level range of semi-persistent scheduling is 0~15, and DCI only needs to be issued each time when semi-persistent scheduling is activated or deactivated, so PDCCH overhead is small. When the channel condition is very good, when 15 PRBs are scheduled, the dynamic scheduling level is 28, and the size of source block scheduled is 11064, while the MCS level of semi-persistent scheduling is 15, and the size of the source block scheduled is 4264, which is almost 2.5 times of the source block size of semi-persistent scheduling. Therefore, dynamic scheduling and semi-persistent scheduling have their respective strengths and weaknesses. Dynamic scheduling may schedule a higher modulation and coding level, but PDCCH resource overhead is big. Semi-persistent scheduling has the least PDCCH resource overhead, but the maximum MCS level of scheduling is 15. Both dynamic scheduling mode and semi-persistent scheduling mode may be simply realized, but the flexibility is poor, the strengths of semi-persistent scheduling mode and dynamic scheduling mode can't be displayed simultaneously, and PDCCH resources can't be assigned rationally, which reduces the total capacity of the base station.

SUMMARY

The technical problem to be solved by the invention is how to reduce the resource overhead of control channel while improving the throughput of the base station.

In order to realize the mentioned aim, embodiments of the invention provide a dynamic delay scheduling method and base station for voice data with a higher modulation and coding level and smaller PDCCH resource overhead.

In an aspect, an embodiment of the invention provides a dynamic delay scheduling method for voice data, which includes the following operations:

judging whether a semi-persistent scheduling mode is enabled, and whether a UE supports the semi-persistent scheduling mode;

if the semi-persistent scheduling mode is enabled and the UE supports the semi-persistent scheduling mode, implementing scheduling in the semi-persistent scheduling mode; and if the semi-persistent scheduling mode is not enabled or the UE does not support the semi-persistent scheduling mode, judging whether a dynamic delay scheduling mode is enabled; if so, implementing scheduling by binding two consecutive voice data packets in the dynamic delay scheduling mode; otherwise, implementing scheduling in a dynamic scheduling mode.

Preferably, the scheduling by binding two consecutive voice data packets in the dynamic delay scheduling mode includes:

acquiring two voice data packets arriving consecutively in a preset time interval;

acquiring attribute information of the two voice data packets and transmitting the attribute information to a Media Access Control (MAC) layer;

reserving a buffer space with a certain size in a buffer according to the attribute information of the two voice data packets; and scheduling the two voice data packets in the reserved buffer space.

Preferably, the attribute information of the voice data packets includes:

sizes of the voice data packets, whether the voice data packets have header compression and coding formats of the voice data packets.

Preferably, the scheduling of the two voice data packets in the reserved buffer space includes:

during an uplink dynamic delay scheduling, judging whether the uplink data with an LCG equal to 1 exists; if any, inserting the uplink data to an uplink scheduling queue, and registering an uplink reserved buffer space; and during a downlink dynamic delay scheduling, judging whether the downlink data with a QCI equal to 1 exists; if any, inserting the downlink data to a downlink scheduling queue, and registering a downlink reserved buffer space.

Preferably, judging whether semi-persistent scheduling mode is enabled, and whether UE supports the semi-persistent scheduling mode further includes:

scheduling, by a MAC layer, the voice data packet in the dynamic scheduling mode.

In another aspect, an embodiment of the invention further provides a base station, which includes:

a judging module configured to judge whether a semi-persistent scheduling mode is enabled, and whether a UE supports the semi-persistent scheduling mode;

a semi-persistent scheduling module configured to implement scheduling in the semi-persistent scheduling mode when the semi-persistent scheduling mode is enabled and the UE supports the semi-persistent scheduling mode; and a dynamic delay scheduling module configured to judge whether a dynamic delay scheduling mode is enabled when the semi-persistent scheduling mode is not enabled or when the UE does not support the semi-persistent scheduling mode, if so, implement scheduling by binding two consecutive voice data packets in the dynamic delay mode, otherwise, implement scheduling in a dynamic scheduling mode.

Preferably, the dynamic delay scheduling module includes:

a first acquiring sub-module configured to acquire two voice data packets arriving consecutively in a preset time interval;

a second acquiring sub-module configured to acquire attribute information of the two voice data packets acquired from the first acquiring sub-module and transmit the attribute information to an MAC layer;

a reserving sub-module configured to reserve a buffer space with a certain size in a buffer according to the attribute information of two voice data packets acquired by the second acquiring sub-module; and a scheduling sub-module configured to schedule the two voice data packets in the reserved buffer space.

Preferably, the scheduling sub-module includes:

an uplink dynamic delay scheduling sub-module configured to judge whether the uplink data with an LCG equal to 1 exists during uplink dynamic delay scheduling, and if any, insert the uplink data to an uplink scheduling queue, and register an uplink reserved buffer space; and a downlink dynamic delay scheduling sub-module configured to judge whether the downlink data with a QCI equal to 1 exists during downlink dynamic delay scheduling, and if any, insert the downlink data to a downlink scheduling queue, and register a downlink reserved buffer space.

Preferably, the attribute information of the voice data packets includes:

sizes of the voice data packets, whether the voice data packets have header compression and coding formats of the voice data packets.

Preferably, the base station further includes:

a dynamic scheduling module configured to schedule the voice data packets in dynamic scheduling mode through an MAC layer.

By the adoption of the dynamic delay scheduling method and base station provided in the invention, two voice data packets arriving consecutively are bound as a group of voice data and scheduled through one PDCCH, which not only reduces the overhead of PDCCH resource by half, but also maintains a higher modulation and coding level. The invention improves the flexibility of voice service scheduling and is conducive to the rational allocation of PDCCH resource, and may improve the user capacity of the base station.

BRIEF DESCRIPTION OF THE DRAWINGS

By reference to the figures, characteristics and advantages of the invention may be more clearly understood. The figures are schematic and shall not be understood as any restriction to the invention.

DETAILED DESCRIPTION OF THE EMBODIMENTS

Embodiments of the invention will be further described below with reference to the figures and embodiments. The following embodiments are used for describing the invention instead of setting restriction to the scope of the invention.

First Embodiment

Figure 1:
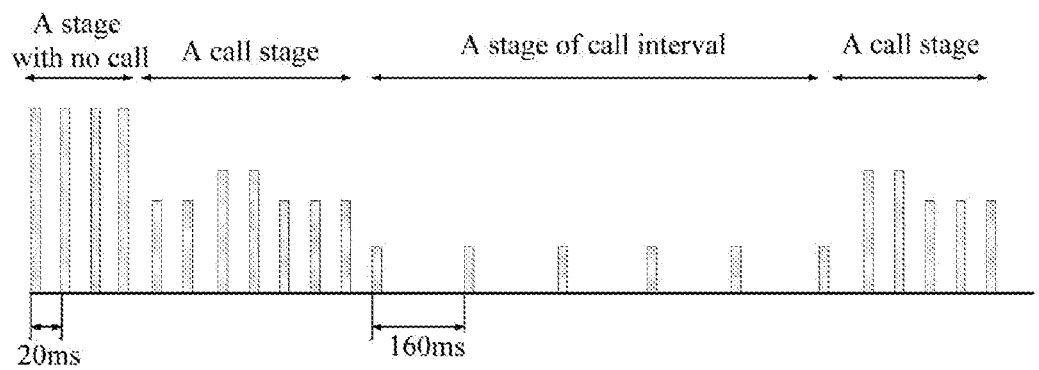
FIG. 1 is a schematic diagram of an output rule of the voice data packets in the prior art.
Figure 2A:
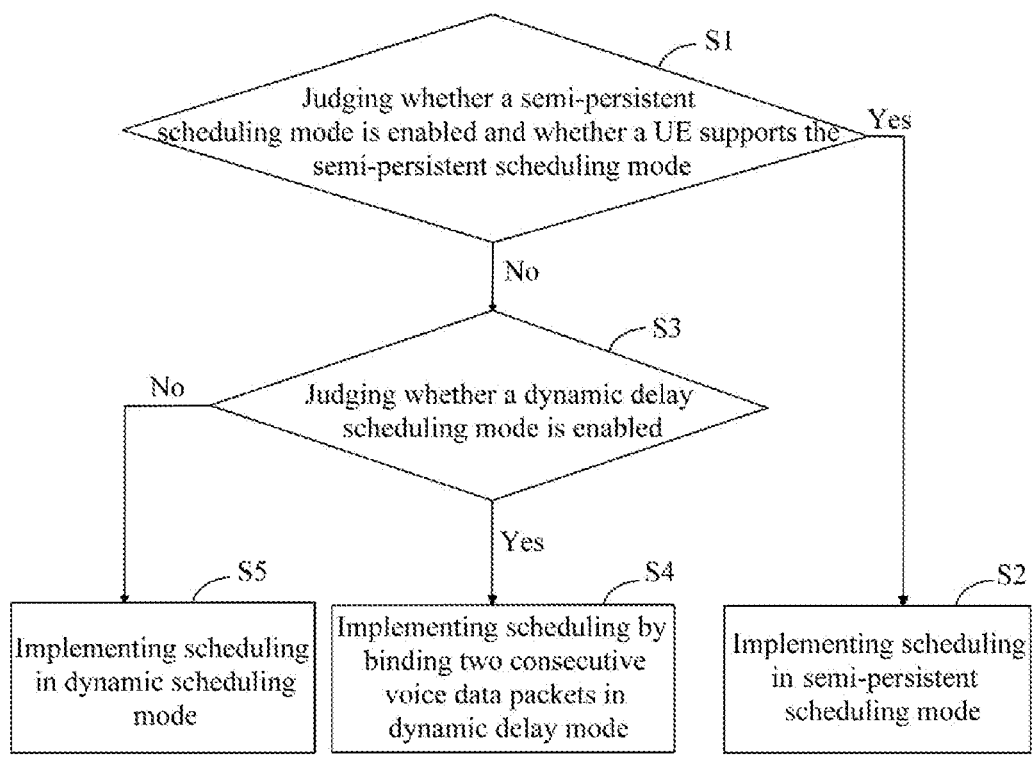
FIG. 2A to FIG. 2C are flowcharts of a dynamic delay scheduling method of a first embodiment.

As shown in FIG. 2A, the invention relates to a dynamic delay scheduling method for voice data which includes the following operations.

S1: judging whether a semi-persistent scheduling mode is enabled and whether a UE supports the semi-persistent scheduling mode; if so, perform operation S2; otherwise, perform operation S3.

S2: implementing scheduling in the semi-persistent scheduling mode.

S3: judging whether a dynamic delay scheduling mode is enabled; if so, perform operation S4; otherwise, perform operation S5.

S4: implementing scheduling by binding two consecutive voice data packets in the dynamic delay mode.

S5: implementing scheduling in a dynamic scheduling mode.

In the embodiment, the semi-persistent scheduling mode may be adopted for scheduling when the semi-persistent scheduling mode is enabled and the UE supports the semi-persistent scheduling mode; otherwise, the dynamic delay scheduling mode will be adopted; and if the dynamic delay scheduling mode is not enabled either, the dynamic scheduling mode may be adopted for scheduling. When the dynamic delay scheduling mode is adopted, two voice data packets arriving consecutively are bound as a group of voice data and scheduled through one PDCCH, which not only reduces the overhead of PDCCH resource by half, but also maintains a higher modulation and coding level.

Figure 2B:
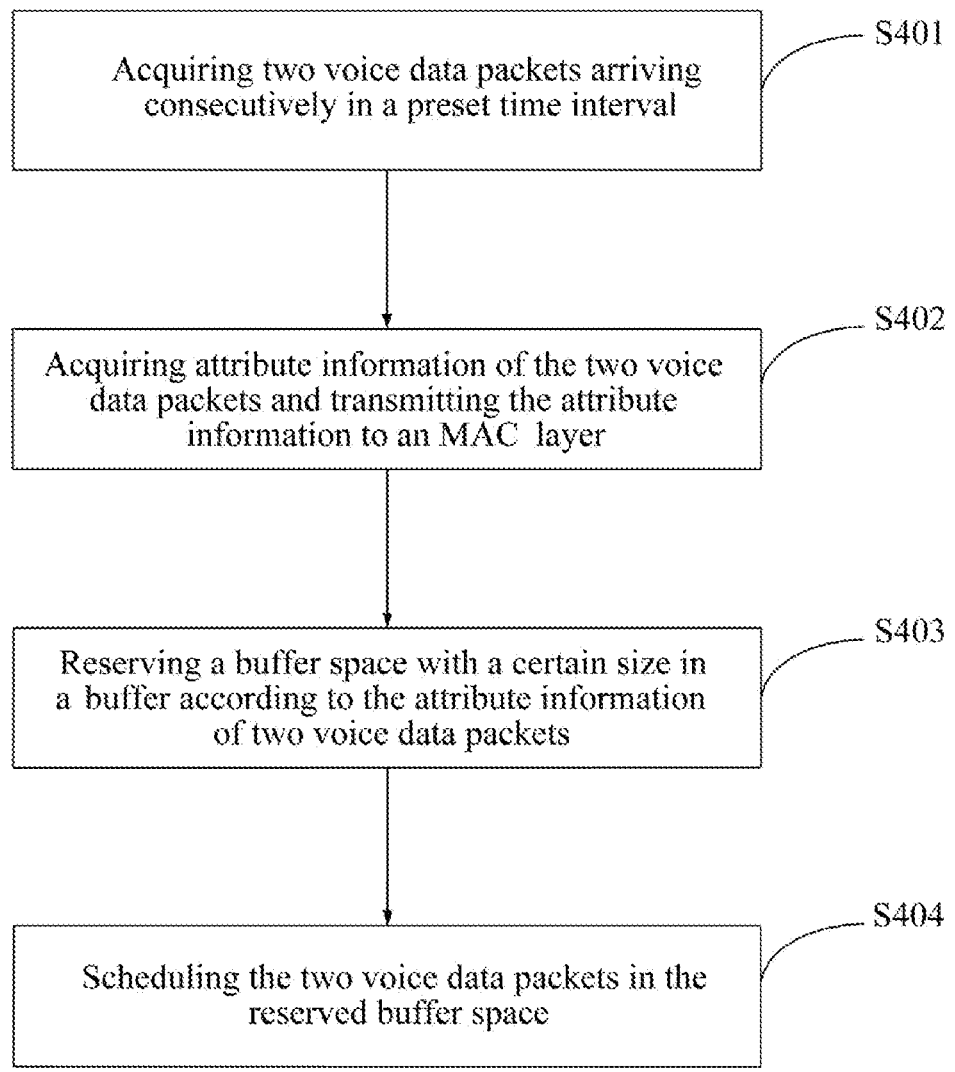

During a specific implementation, as shown in FIG. 2B, the operation S4 includes the following operations.

S401: acquiring two voice data packets arriving consecutively in a preset time interval.

S402: acquiring attribute information of the two voice data packets and transmitting the attribute information to a Media Access Control (MAC) layer.

S403: reserving a buffer space with a certain size in a buffer according to the attribute information of two voice data packets.

S404: scheduling the two voice data packets in the reserved buffer space.

Further, Packet Data Convergence Protocol (PDCP) acquires attribute information of the two voice data packets. An attribute information of a voice data packet includes: the size of the voice data packet, whether the voice data packet has header compression and coding format of the voice data packet, so as to reserve a buffer space with a certain size according to attribute information of the voice data packet. For example, one type of attribute information of a voice data packet includes transmission through IPV4 protocol, having header compression, and narrow band transmission in code format; another type of attribute information of a voice data packet includes transmission through IPV6 protocol, having no header compression, and broadband transmission in code format.

Further, the preferred preset time interval is 40 ms. The sampling time of one voice data packet is 20 ms, and in the method, two voice data packets consecutive in time are bound for scheduling, so the preset time interval is 40 ms. In the embodiment, no more than two voice data packets may be acquired in the dynamic delay scheduling method for voice data, because acquisition of more than two voice data packets will cause too long time delay of the voice data packets and affect perception of the voice service.

Figure 2C:
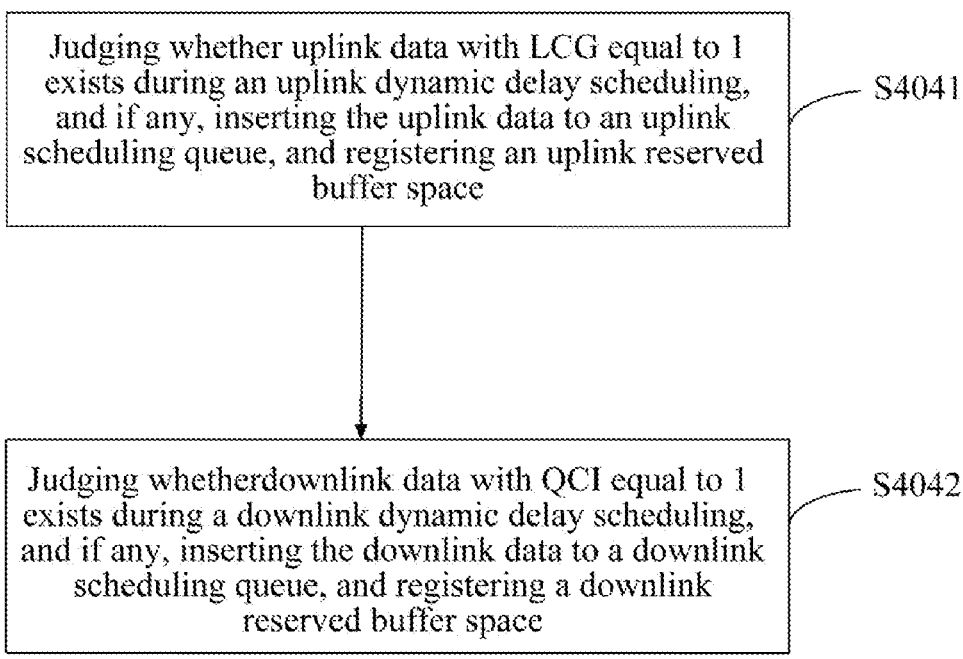

In a specific implementation, as shown in FIG. 2C, operation S404 includes the following operations.

S4041: judging whether uplink data with a Logical Channel Group (LCG) equal to 1 exists during an uplink dynamic delay scheduling, and if any, inserting the uplink data to an uplink scheduling queue, and registering an uplink reserved buffer space.

S4042: judging whether downlink data with a QCI (QoS Class Identifier) equal to 1 exists during a downlink dynamic delay scheduling, and if any, inserting the downlink data to a downlink scheduling queue, and registering a downlink reserved buffer space.

Further, dynamic delay scheduling is classified into uplink dynamic delay scheduling and downlink dynamic delay scheduling. During uplink dynamic delay scheduling, what is scheduled is a voice data packet, so when the voice during uplink dynamic delay scheduling is under an activated state, whether there is uplink data with an LCG equal to 1 is determined to show that the data transmitted by the uplink channel is voice data; the buffer space with a size of two voice data packets is registered again to schedule the two voice data packets bound together. During downlink dynamic delay scheduling, a QCI of the voice data packet in downlink dynamic delay scheduling is set to be 1, meaning that the data transmitted by the downlink channel is voice data.

In the embodiment, before operation S1, the following operations are included.

S101: MAC layer schedules the voice data packet in dynamic scheduling mode, which is not shown in the figure.

In a specific implementation, before judging whether the semi-persistent scheduling mode is enabled and whether the UE supports the semi-persistent scheduling mode, dynamic scheduling is adopted for scheduling of the voice data packets.

In conclusion, by the adoption of the dynamic delay scheduling method for voice data provided in the embodiment of the invention, two voice data packets arriving consecutively are bound together as a group of voice data to be scheduled through one PDCCH, which reduces the PDCCH resource overhead by half while maintaining a higher modulation and coding level. The invention improves the flexibility of voice service scheduling and is conducive to the rational allocation of channel resources, and may improve the user capacity of the base station.

Second Embodiment

Figure 3:
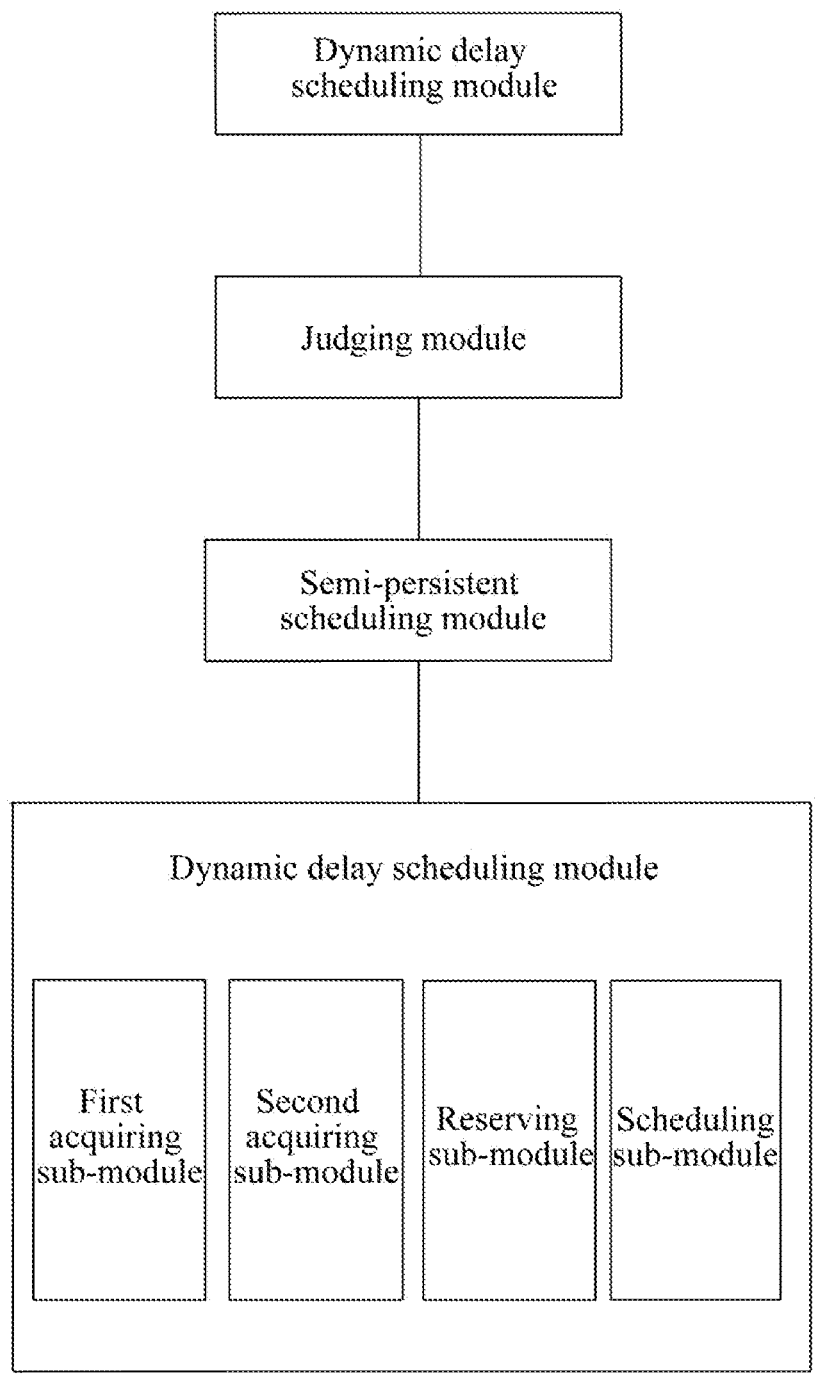
FIG. 3 is a structure diagram of a dynamic delay scheduling base station in a second embodiment.

An embodiment of the invention further provides a base station, as shown in FIG. 3, which includes: a judging module configured to judge whether a semi-persistent scheduling mode is enabled, and whether a UE supports the semi-persistent scheduling mode; a semi-persistent scheduling module configured to implement scheduling in semi-persistent scheduling mode when the semi-persistent scheduling mode is enabled and the UE supports the semi-persistent scheduling mode; and a dynamic delay scheduling module configured to judge whether a dynamic delay scheduling mode is enabled when the semi-persistent scheduling mode is not enabled, if so, implement scheduling by binding two consecutive voice data packets in dynamic delay scheduling mode, otherwise, implement scheduling in dynamic scheduling mode.

In the embodiment, the semi-persistent scheduling mode may be adopted for scheduling when the semi-persistent scheduling mode is enabled and the UE supports the semi-persistent scheduling mode; otherwise, the dynamic delay scheduling mode will be adopted. If the dynamic delay scheduling mode is not enabled either, the dynamic scheduling mode may be adopted for scheduling. When the dynamic delay scheduling mode is adopted, two voice data packets arriving consecutively are bound as a group of voice data and scheduled through one PDCCH, which not only reduces the overhead of PDCCH resource by half, but also maintains a higher modulation and coding level.

In a specific implementation, the dynamic delay scheduling module includes: a first acquiring sub-module configured to acquire two voice data packets arriving consecutively in a preset time interval; a second acquiring sub-module configured to acquire attribute information of the two voice data packets acquired from the first acquiring sub-module and transmit the attribute information to a MAC layer; a reserving sub-module configured to reserve a buffer space with a certain size in a buffer according to the attribute information of two voice data packets acquired by the second acquiring sub-module; and a scheduling sub-module configured to schedule the two voice data packets in the reserved buffer space.

Further, Packet Data Convergence Protocol (PDCP) acquires attribute information of the two voice data packets. An attribute information of a voice data packet includes: the size of a voice data packet, whether the voice data packet has header compression and coding format of the voice data packet, so as to reserve a buffer space with a certain size according to attribute information of the voice data packet.

Further, the preferred preset time interval is 40 ms. The sampling time of one voice data packet is 20 ms, and in the method, two voice data packets consecutive in time are bound for scheduling, so the preset time interval is 40 ms. In the embodiment, no more than two voice data packets may be acquired in the dynamic delay scheduling method for voice data, because acquisition of more than two voice data packets will cause too long time delay of the voice data packets and affect perception of the voice service.

In a specific implementation, the scheduling sub-module includes: an uplink dynamic delay scheduling sub-module configured to judge whether uplink data with an LCG equal to 1 exists during uplink dynamic delay scheduling, and if any, insert the uplink data to an uplink scheduling queue, and register an uplink reserved buffer space; and a downlink dynamic delay scheduling sub-module configured to judge whether downlink data with a QCI equal to 1 exists during downlink dynamic delay scheduling, and if any, insert the downlink data to a downlink scheduling queue, and register a downlink reserved buffer space.

Further, dynamic delay scheduling is classified into uplink dynamic delay scheduling and downlink dynamic delay scheduling. During uplink dynamic delay scheduling, what is scheduled is a voice data packet, so when the voice during uplink dynamic delay scheduling is under an activated state, whether there is uplink data with an LCG equal to 1 is determined to show that the data transmitted by the uplink channel is voice data; the buffer space with a size of two voice data packets is registered again to schedule the two voice data packets bound together; during downlink dynamic delay scheduling, a QCI of the voice data packet in downlink dynamic delay scheduling is set to be 1, meaning that the data transmitted by the downlink channel is voice data.

The base station in the embodiment further includes: a dynamic scheduling module configured to schedule the voice data packets in dynamic scheduling mode through the MAC layer.

In a specific implementation, before judging whether the semi-persistent scheduling mode is enabled and whether the UE supports the semi-persistent scheduling mode, dynamic scheduling is adopted for scheduling of the voice data packets.

In conclusion, by the adoption of the dynamic delay scheduling method and base station for voice data provided in the embodiment of the invention, two voice data packets arriving consecutively are bound together as a group of voice data to be scheduled through one PDCCH, which reduces the PDCCH resource overhead by half while maintaining a higher modulation and coding level. The invention improves the flexibility of voice service scheduling and is conducive to the rational allocation of channel resources, and may improve the user capacity of the base station.

Those skilled in the art shall understand the embodiment of the invention may include a method, a system or a computer program product. Therefore, the embodiments of the invention may be represented with only hardware, or with only software, or with a combination of software and hardware. Besides, the embodiments of the invention may also adopt the computer program product performed on one or a plurality of computer useable memory mediums (including, but not limited to disk memory, CD-ROM, optical memory, and the like) which include a computer useable program code.

The invention is described with reference to the flowchart and/or block diagram of the method, equipment (system) and computer program product of the embodiment. What needs to be understood is that the computer program command may perform each flow and/or block of the flowchart and/or the block diagram, or the combination of each flow and/or block of the flowchart and/or the block diagram. A processor from the computer program commands to an all-purpose computer, dedicated computer, embedded processor or other programmable DHU (data handling unit) may be provided to produce a machine, so that the commands executed by the processor of a computer or other programmable DHUs may generate a device which is used to realize the specified functions of one or a plurality of flows of the flowchart and/or one or a plurality of blocks of the block diagram.

These computer program commands may also be stored in a computer-readable memory which may guide the computer or other programmable DHUs to work in a specified way, so that the commands stored in the computer-readable memory may produce a product which includes the command device. The command device may realize the functions specified in one or a plurality of flows of the flowchart and/or one or a plurality of blocks of the block diagram.

These computer program commands may also be loaded to a computer or other programmable DHUs, so that a series of operations may be executed by the computer or other programmable equipment to realize computer processing, and the command executed by the computer or other programmable equipment may provide the steps for realizing the functions in one or a plurality of flows of the flowchart and/or one or a plurality of blocks of the block diagram.

Finally, it shall be noted that the relational terms such as "a first and a second" hereof are only used to differentiate one entity or operation from another entity or operation, and may not specify or suggest that such relationship or sequence exists between these entities or operations. Besides, the term "include" or "comprise" or any other variants is non-exclusive, so that the process, method, object or equipment which include a series of elements may also include other elements not having been listed or the elements inherent to such process, method, object or equipment. Without further restriction, the element determinative by the phrase "include(s) a . . . " in the process, method, object or equipment may also include other same elements. The orientation or position relationship indicated by the terms "up" or "down" and the like is the orientation or position relationship based on the figures, and is only used to describe the invention and simplify the description, instead of indicating or suggesting that the device or component mentioned shall have a specific orientation, or be constructed and operated in a specific orientation, so the terms shall not be apprehended as restriction of the invention. Unless otherwise specified or restricted, terms like "install", "connect" and "link" shall be understood in a broad sense. For example, a connection may be permanent connection or removable connection, or integrated connection, or mechanical connection, electrical connection, direct connection, or indirect connection through a medium, or interconnection between two components. Those skilled in the art may understand the specific meanings of the above terms in the invention according to specific circumstances.

The specification provided in the invention describes a great deal of concrete details. However, what should be understood is that the embodiments of the invention may be carried out without these concrete details. Some cases do not display in detail the commonly known methods, structures and technologies, so as not to blur the understanding of the specification. Similarly, it shall be understood that in order to simplify the disclosure and help to understand one or more aspects of the invention, in the descriptions of the embodiments of the invention, characteristics of the invention have sometimes been grouped to a single embodiment, figure, or the descriptions thereof. However, the disclosed method shall not be interpreted to reflect the following intention: namely, more characteristics than the characteristics recorded clearly in each claim are required by the invention to be protected. More precisely, as reflected by the claims, the aspects of the invention are less than all characteristics of each single embodiment disclosed. Therefore, the claims following the detailed description of the embodiments of the invention are clearly integrated to the detailed description of the embodiments of the invention, and each claim is considered as an independent embodiment of the invention.

The above embodiments are only used to describe the technical scheme of the invention, and do not constitute any restriction to the technical scheme. Although detailed descriptions are given to the invention by reference to the aforementioned embodiments, those skilled in the art shall understand that: the technical scheme recorded by the aforementioned embodiments may be modified, or the technical characteristics in part or whole may be replaced equivalently, such modification or replacement will not separate in essence the technical scheme from the scope of technical scheme of the embodiments of the invention, and shall be included in the scope of the claims and specification of the invention.

INDUSTRIAL APPLICABILITY

In the dynamic delay scheduling method and base station for voice data provided in the invention, two voice data packets arriving consecutively are bound together as a group of voice data to be scheduled through one PDCCH, which reduces the PDCCH resource overhead by half while maintaining a higher modulation and coding level. The invention improves the flexibility of voice service scheduling and is conducive to the rational allocation of channel resources, and may improve the user capacity of the base station, so the invention has industrial applicability.

The invention claimed is:

1. A scheduling method for voice data, comprising:
determining whether semi-persistent scheduling is enabled, and whether a User Equipment, UE, supports the semi-persistent scheduling;
in response to that the semi-persistent scheduling is not enabled or the UE does not support the semi-persistent scheduling, determining whether dynamic delay scheduling is enabled, wherein the dynamic delay scheduling comprises scheduling by binding two consecutive voice data packets; and in response to that the dynamic delay scheduling is enabled, implementing the dynamic delay scheduling;
wherein the scheduling by binding two consecutive voice data packets comprises:
acquiring two voice data packets arriving consecutively in a preset time interval;
acquiring attribute information of the two voice data packets and transmitting the attribute information to a Media Access Control, MAC, layer;
reserving a buffer space with a certain size in a buffer according to the attribute information of the two voice data packets; and
scheduling the two voice data packets in the reserved buffer space;
wherein the scheduling of the two voice data packets in the reserved buffer space comprises:
during an uplink dynamic delay scheduling, judging whether uplink data with a Logical Channel Group, LCG, equal to 1 exists; if any, inserting the uplink data to an uplink scheduling queue, and registering an uplink reserved buffer space; and
during a downlink dynamic delay scheduling, judging whether downlink data with a QoS Class Identifier, QCI, equal to 1 exists; if any, inserting the downlink data to a downlink scheduling queue, and registering a downlink reserved buffer space.

2. The scheduling method for voice data according to claim 1, wherein the attribute information of the voice data packets comprises:
sizes of the voice data packets, whether the voice data packets have header compression and coding formats of the voice data packets.

3. The scheduling method for voice data according to claim 1, wherein before determining whether the semi-persistent scheduling is enabled, and whether the UE supports the semi-persistent scheduling, the method further comprises:
scheduling, by a Media Access Control, MAC, layer, the voice data packets using the dynamic scheduling.

4. The scheduling method for voice data according to claim 1, wherein in response to that the dynamic delay scheduling is not enabled, implementing the dynamic scheduling.

5. A base station, comprising:
a processor, and a memory storing computer program codes; wherein the processor is configured to execute the computer program codes in the memory to:
determine whether semi-persistent scheduling is enabled, and whether a User Equipment, UE, supports the semi-persistent scheduling; and
in response to that the semi-persistent scheduling mode is not enabled or the UE does not support the semi-persistent scheduling mode, determine whether dynamic delay scheduling is enabled wherein the dynamic delay scheduling comprises scheduling by binding two consecutive voice data packets; and in response to that the dynamic delay scheduling is enabled, implement the dynamic delay scheduling;
wherein the processor is further configured to execute the computer program codes in the memory to:
acquire two voice data packets arriving consecutively in a preset time interval;
acquire attribute information of the two voice data packets acquired from the first acquiring sub-module and transmit the attribute information to a Media Access Control, MAC, layer;
reserve a buffer space with a certain size in a buffer according to the attribute information of two voice data packets acquired by the second acquiring sub-module; and
schedule the two voice data packets in the reserved buffer space;
wherein the processor is further configured to execute the computer program codes in the memory to:
during an uplink dynamic delay scheduling, judge whether uplink data with a Logical Channel Group, LCG, equal to 1 exists during uplink dynamic delay scheduling, and if any, insert the uplink data to an uplink scheduling queue, and register an uplink reserved buffer space; and
during a downlink dynamic delay scheduling, judge whether downlink data with a QoS Class Identifier, QCI, equal to 1 exists during downlink dynamic delay scheduling, and if any, insert the downlink data to a downlink scheduling queue, and register a downlink reserved buffer space.

6. The base station according to claim 5, where the attribute information of the voice data packets comprise:
sizes of the voice data packets, whether the voice data packets have header compression and coding formats of the voice data packets.

7. The base station according to claim 5, wherein the processor is further configured to execute the computer program codes in the memory to:
    schedule the voice data packets using dynamic scheduling mode through a Media Access Control, MAC, layer.

8. The base station according to claim 5, wherein the processor is further configured to execute the computer program codes in the memory to:
    in response to that the dynamic delay scheduling is not enabled, implement the dynamic scheduling.

* * * * *